(12) United States Patent
Welygan et al.

(10) Patent No.: US 9,150,765 B2
(45) Date of Patent: Oct. 6, 2015

(54) TRANSFER ASSISTED SCREEN PRINTING METHOD OF MAKING SHAPED ABRASIVE PARTICLES AND THE RESULTING SHAPED ABRASIVE PARTICLES

(71) Applicant: 3M INNOVATIVE PROPERTIES COMPANY, St. Paul, MN (US)

(72) Inventors: Dennis G. Welygan, Woodbury, MN (US); Dwight D. Erickson, Oakdale, MN (US); John T. Boden, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 178 days.

(21) Appl. No.: 13/908,268

(22) Filed: Jun. 3, 2013

(65) Prior Publication Data
US 2013/0255162 A1    Oct. 3, 2013

Related U.S. Application Data

(62) Division of application No. 12/827,274, filed on Jun. 30, 2010, now Pat. No. 8,480,772.

(60) Provisional application No. 61/289,188, filed on Dec. 22, 2009.

(51) Int. Cl.
| C04B 35/10 | (2006.01) |
| C09K 3/14 | (2006.01) |
| B41M 1/12 | (2006.01) |

(52) U.S. Cl.
CPC ............... *C09K 3/1409* (2013.01); *B41M 1/12* (2013.01); *C04B 35/10* (2013.01); *Y10T 428/2982* (2015.01)

(58) Field of Classification Search
CPC ..................... C04B 35/624; C04B 223/32185
See application file for complete search history.

(56) References Cited

U.S. PATENT DOCUMENTS

| 1,910,444 A | 5/1933 | Nicholson |
| 3,041,156 A | 6/1962 | Rowse |
| 3,079,243 A | 2/1963 | Ueltz |

(Continued)

FOREIGN PATENT DOCUMENTS

| CA | 743 715 | 10/1966 |
| EP | 0 293 163 | 11/1988 |

(Continued)

OTHER PUBLICATIONS

U.S. Appl. No. 12/570,067 entitled "Shaped Abrasive Particles With Low Roundness Factor" filed Sep. 30, 2009.

(Continued)

*Primary Examiner* — Joseph S Del Sole
*Assistant Examiner* — Russell Kemmerle, III
(74) *Attorney, Agent, or Firm* — Scott A. Baum

(57) ABSTRACT

Shaped ceramic articles can be obtained by screen printing the desired shapes from a dispersion of a precursor of the ceramic onto a receiving surface using a transfer assisted technique that applies a differential pressure, at least partially drying the screen printed shapes, and firing them to generate the shaped ceramic articles. Shaped abrasive particles made using lower viscosity sol gels that tended to flow or creep after the screen printing formation were found to have higher grinding performance over screen printed shaped abrasive particles made with higher viscosity sol gels.

24 Claims, 5 Drawing Sheets

(56) References Cited

U.S. PATENT DOCUMENTS

| | | |
|---|---|---|
| 3,387,957 A | 6/1968 | Howard |
| 3,481,723 A | 12/1969 | Kistler |
| 3,536,005 A | 10/1970 | Derrickson |
| 3,874,856 A | 4/1975 | Leeds |
| 3,909,991 A | 10/1975 | Coes, Jr. |
| 4,150,078 A | 4/1979 | Miller |
| 4,314,827 A | 2/1982 | Leitheiser |
| 4,341,663 A | 7/1982 | Derleth |
| 4,393,021 A | 7/1983 | Eisenberg |
| 4,548,617 A | 10/1985 | Miyatani |
| 4,744,802 A | 5/1988 | Schwabel |
| 4,799,939 A | 1/1989 | Bloecher |
| 4,848,041 A | 7/1989 | Kruschke |
| 4,954,462 A | 9/1990 | Wood |
| 4,963,012 A | 10/1990 | Tracy |
| 4,997,461 A | 3/1991 | Markhoff-Matheny |
| 5,009,675 A | 4/1991 | Kunz |
| 5,009,676 A | 4/1991 | Rue et al. |
| 5,011,508 A | 4/1991 | Wald |
| 5,035,723 A | 7/1991 | Kalinowski |
| 5,042,991 A | 8/1991 | Kunz |
| 5,049,166 A | 9/1991 | Kirkendall |
| 5,078,753 A | 1/1992 | Broberg |
| 5,085,671 A | 2/1992 | Martin |
| 5,090,968 A | 2/1992 | Pellow |
| 5,120,327 A | 6/1992 | Dennis |
| 5,152,917 A | 10/1992 | Pieper |
| 5,185,299 A | 2/1993 | Wood |
| 5,201,916 A | 4/1993 | Berg |
| 5,213,591 A | 5/1993 | Celikkaya |
| 5,282,875 A | 2/1994 | Wood |
| 5,304,331 A | 4/1994 | Leonard |
| 5,312,789 A | 5/1994 | Wood |
| 5,312,791 A | 5/1994 | Coblenz |
| 5,366,523 A | 11/1994 | Rowenhorst |
| 5,409,645 A | 4/1995 | Torre, Jr. |
| 5,431,967 A | 7/1995 | Manthiram |
| 5,435,816 A | 7/1995 | Spurgeon |
| 5,441,549 A | 8/1995 | Helmin |
| 5,443,603 A | 8/1995 | Kirkendall |
| 5,454,844 A | 10/1995 | Hibbard |
| 5,496,386 A | 3/1996 | Broberg |
| 5,516,348 A | 5/1996 | Conwell |
| 5,551,963 A | 9/1996 | Larmie |
| 5,576,409 A | 11/1996 | Mackey |
| 5,584,896 A | 12/1996 | Broberg |
| RE35,570 E | 7/1997 | Rowenhorst |
| 5,645,619 A | 7/1997 | Erickson |
| 5,667,542 A | 9/1997 | Law |
| 5,672,097 A | 9/1997 | Hoopman |
| 5,725,162 A | 3/1998 | Garg |
| 5,776,214 A | 7/1998 | Wood |
| 5,779,743 A | 7/1998 | Wood |
| 5,893,935 A | 4/1999 | Wood |
| 5,902,647 A | 5/1999 | Venkataramani |
| 5,908,477 A | 6/1999 | Harmer |
| 5,908,478 A | 6/1999 | Wood |
| 5,946,991 A | 9/1999 | Hoopman |
| 5,975,987 A | 11/1999 | Hoopman |
| 5,984,988 A | 11/1999 | Berg |
| 6,019,805 A | 2/2000 | Herron |
| 6,053,956 A | 4/2000 | Wood |
| 6,054,093 A | 4/2000 | Torre, Jr. |
| 6,080,215 A | 6/2000 | Stubbs |
| 6,080,216 A | 6/2000 | Erickson |
| 6,129,540 A | 10/2000 | Hoopman |
| 6,206,942 B1 | 3/2001 | Wood |
| 6,228,134 B1 | 5/2001 | Erickson |
| 6,261,682 B1 | 7/2001 | Law |
| 6,264,710 B1 | 7/2001 | Erickson |
| 6,277,160 B1 | 8/2001 | Stubbs |
| 6,277,161 B1 | 8/2001 | Castro |
| 6,287,353 B1 | 9/2001 | Celikkaya |
| 6,312,324 B1 | 11/2001 | Mitsui |
| 6,319,108 B1 | 11/2001 | Adefris |
| 6,475,253 B2 | 11/2002 | Culler |
| 6,524,681 B1 | 2/2003 | Seitz |
| 6,537,140 B1 | 3/2003 | Miller |
| 6,696,258 B1 | 2/2004 | Wei |
| 6,843,815 B1 | 1/2005 | Thurber |
| 6,881,483 B2 | 4/2005 | McArdle |
| 6,974,930 B2 | 12/2005 | Jense |
| 7,297,402 B2 | 11/2007 | Evans |
| 7,373,887 B2 | 5/2008 | Jackson |
| 7,524,345 B2 | 4/2009 | Nevoret |
| 7,867,302 B2 | 1/2011 | Nevoret |
| 7,875,091 B2 | 1/2011 | Nevoret |
| 2001/0027623 A1 | 10/2001 | Rosenflanz |
| 2002/0026752 A1 | 3/2002 | Culler |
| 2002/0151265 A1 | 10/2002 | Adefris |
| 2003/0085204 A1 | 5/2003 | Lagos |
| 2003/0110707 A1 | 6/2003 | Rosenflanz |
| 2003/0126800 A1 | 7/2003 | Seth |
| 2004/0003895 A1 | 1/2004 | Amano |
| 2004/0018802 A1* | 1/2004 | Welygan et al. ........ 451/28 |
| 2004/0148967 A1 | 8/2004 | Celikkaya |
| 2004/0235406 A1 | 11/2004 | Duescher |
| 2004/0244675 A1 | 12/2004 | Kishimoto |
| 2005/0020190 A1 | 1/2005 | Schutz |
| 2005/0060941 A1 | 3/2005 | Provow |
| 2005/0060947 A1 | 3/2005 | McArdle |
| 2005/0064805 A1 | 3/2005 | Culler |
| 2005/0118939 A1 | 6/2005 | Duescher |
| 2005/0130568 A1* | 6/2005 | Welygan et al. ........ 451/59 |
| 2005/0132655 A1 | 6/2005 | Anderson |
| 2005/0232853 A1 | 10/2005 | Evans |
| 2005/0284029 A1 | 12/2005 | Bourlier |
| 2006/0156634 A1* | 7/2006 | Welygan et al. ........ 51/298 |
| 2006/0185256 A1 | 8/2006 | Nevor |
| 2007/0020457 A1 | 1/2007 | Adefris |
| 2007/0072527 A1 | 3/2007 | Palmgren |
| 2008/0172951 A1 | 7/2008 | Starling |
| 2008/0262577 A1 | 10/2008 | Altshuler |
| 2008/0299875 A1 | 12/2008 | Duescher |
| 2009/0165394 A1 | 7/2009 | Culler |
| 2009/0169816 A1 | 7/2009 | Erickson |
| 2010/0003904 A1 | 1/2010 | Duescher |
| 2010/0146867 A1 | 6/2010 | Boden |
| 2010/0151195 A1 | 6/2010 | Culler |
| 2010/0151196 A1 | 6/2010 | Adefris |
| 2010/0151201 A1 | 6/2010 | Erickson |

FOREIGN PATENT DOCUMENTS

| | | |
|---|---|---|
| EP | 0 662 110 | 7/1995 |
| EP | 1 371 451 | 12/2003 |
| GB | 986 847 | 3/1965 |
| JP | 60-006356 | 1/1985 |
| JP | H05-4205 | 1/1993 |
| JP | 2002-038131 | 2/2002 |
| JP | 2003-049158 | 2/2003 |
| JP | 2004-510873 | 4/2004 |
| JP | 2005-161488 | 6/2005 |
| JP | 2006-192540 | 7/2006 |
| WO | WO95/18192 | 7/1995 |
| WO | WO 98/29217 | 7/1998 |
| WO | WO 99/14016 | 3/1999 |
| WO | WO99/38817 | 8/1999 |
| WO | WO01/14494 | 3/2001 |
| WO | WO 2005/112601 | 12/2005 |

OTHER PUBLICATIONS www.abrasivematerials.saint-gobain.com News—Shaped Abrasive Particles Article, Dated Apr. 25, 2011 and retrieved on May 23, 2011.
"Investigation of Shaped Abrasive Particles vol. 1: Review of U.S. Pat. No. 6,054,093 Apr. 25, 2000" © Apr. 2011.

* cited by examiner

100μm

TRANSFER ASSISTED SCREEN PRINTING METHOD OF MAKING SHAPED ABRASIVE PARTICLES AND THE RESULTING SHAPED ABRASIVE PARTICLES

This application is a divisional of U.S. application Ser. No. 12/827,274, filed Jun. 30, 2010, now allowed, which is a national stage filing under 35 U.S.C. 371 of PCT/US2010/059830, filed Dec. 10, 2010, which claims priority to U.S. Provisional Application No. 61/289,188, filed Dec. 22, 2009, the disclosures of which are incorporated by reference in their entirety herein.

BACKGROUND

Abrasive particles and abrasive articles made from the abrasive particles are useful for abrading, finishing, or grinding a wide variety of materials and surfaces in the manufacturing of goods. As such, there continues to be a need for improving the cost, performance, or life of the abrasive particle and/or the abrasive article.

Triangular shaped abrasive particles and abrasive articles using the triangular shaped abrasive particles are disclosed in U.S. Pat. No. 5,201,916 to Berg; U.S. Pat. No. 5,366,523 to Rowenhorst (Re 35,570); and U.S. Pat. No. 5,984,988 to Berg. In one embodiment, the abrasive particles' shape comprised an equilateral triangle. Triangular shaped abrasive particles are useful in manufacturing abrasive articles having enhanced cut rates.

SUMMARY

Shaped abrasive particles, in general, can have superior performance over randomly crushed abrasive particles. By controlling the shape of the abrasive particle, it is possible to control the resulting performance of the abrasive article. The inventors have discovered that by making the shaped abrasive particles from a dispersion of an alpha alumina precursor using a screen printing technique with an assisted transfer of the dispersion from the openings in the printing screen, improved productivity of the process results. Additionally, much thicker shaped abrasive particles can be made since it is possible to remove these thicker particles from the screen openings.

The assisted transfer can comprise applying a differential pressure between a first side of the screen printed shape and a second side of the screen printed shape that is in contact with a receiving surface. In one embodiment, a pressurized transfer roll can apply a positive pressure to the first side to release the screen printed shapes from the printing screen in the form of a continuous printing belt. In another embodiment, the receiving surface can comprise an air permeable receiving surface and a vacuum box or a vacuum roll can be located to provide a pressure less than atmospheric pressure to the second side of the screen printed shapes as they are removed from the apertures in the printing screen. Alternatively, a positive pressure can be applied to the first side of the screen printed shapes while simultaneously applying a pressure lower than atmospheric pressure to the second side.

Briefly, in one embodiment, the method encompasses the production of shaped abrasive particles by a screen printing process which comprises applying a dispersion to a receiving surface through a printing screen having a plurality of apertures corresponding to the desired shape of the shaped abrasive particles. A preferred process comprises applying a dispersion of an alpha alumina precursor to one surface of an apertured printing screen supported on a receiving surface, filling the apertures in the printing screen, removing the printing screen from the receiving surface while applying a differential pressure between a first side of a screen printed shape and a second side of a screen printed shape in contact with the receiving surface, at least partially drying the dispersion to form precursor shaped abrasive particles and firing the precursor shaped abrasive particles to final sintered hardness forming shaped abrasive particles comprising alpha alumina.

Surprisingly, the inventors have determined that a sol gel dispersion having a lower viscosity that creeps or flows under its own weight after the formation process provides shaped abrasive particles having improved grinding performance over shaped abrasive particles made by the same process using a higher viscosity dispersion. Thus, perfectly dimensionally stable sol gel dispersions are not preferred in some embodiments and shaped abrasive particles having a larger second side than the first side and a slumping sidewall have been unexpectedly found to have better grinding performance. The resulting shaped abrasive particle tapers from the larger second side (the side in contact with the receiving surface during drying) to the smaller first side (unsupported air side) even though the apertures used to made the shaped abrasive particle were not tapered (approximately 90 degree sidewall).

The tapering is believed to occur during the drying process or, alternatively, or in combination as a result of the differential pressure applied when removing the screen printed shapes with lower viscosity sol gels. It is possible that the lower viscosity sol gels creep or flow under their own weight during the drying process before becoming substantially dry similar to the way cookie dough in an oven is transformed from an initial round ball into its final disk shape. Thus, the drying process produces shaped abrasive particles having thinner edges with an acute angle between the sidewall of the shaped abrasive particle and the second side. This thinner edge is believed to enhance the grinding performance.

Hence in one embodiment, the invention resides in a process for the production of shaped ceramic articles by a screen printing process which comprises applying a dispersion of a ceramic precursor to a receiving surface through a printing screen comprising a plurality of apertures, removing the printing screen from the receiving surface to form a plurality of screen printed shapes while applying a differential pressure between a first side of the screen printed shape and a second side of the screen printed shape that is in contact with the receiving surface, at least partially drying the screen printed shapes remaining on the receiving surface and firing the screen printed shapes to form sintered shaped ceramic articles.

In another embodiment, the invention resides in a process for the production of shaped abrasive particles comprising alpha alumina, the process comprising screen printing shapes of a boehmite alumina sol gel onto a receiving surface to form a plurality of screen printed shapes, removing the screen printed shapes from a printing screen while applying a differential pressure between a first side of the screen printed shapes and a second side of the screen printed shapes that are in contact with the receiving surface, at least partially drying the screen printed shapes and firing the screen printed shapes at a temperature sufficient to convert the alumina to the alpha phase.

In another embodiment, the invention resides in a process for the production of shaped abrasive particles comprising alpha alumina, the process comprising screen printing shapes of a boehmite alumina sol gel onto an air permeable receiving surface, the air permeable receiving surface located adjacent to a vacuum box or vacuum roll while filling apertures in a printing screen with the sol gel to form a plurality of screen printed shapes, removing the screen printed shapes from the printing screen, at least partially drying the screen printed shapes, and firing the screen printed shapes at a temperature sufficient to convert the alumina to the alpha phase.

In another embodiment, the invention resides in shaped abrasive particles comprising a post-formation flowed surface.

In another embodiment, the invention resides in shaped abrasive particles comprising a first side, a second side, and a sidewall connecting the first side to the second side; the sidewall comprising a first portion intersecting the first surface and a second portion intersecting the second surface and the slope of the first portion is greater than the slope of the second portion.

In another embodiment, the invention resides in shaped abrasive particles comprising a first side, a second side, and a sidewall connecting the first side to the second side; and wherein the first side is concave and the sidewall is concave.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Repeated use of reference characters in the specification and drawings is intended to represent the same or analogous features or elements of the disclosure.

DEFINITIONS

Figure 2:
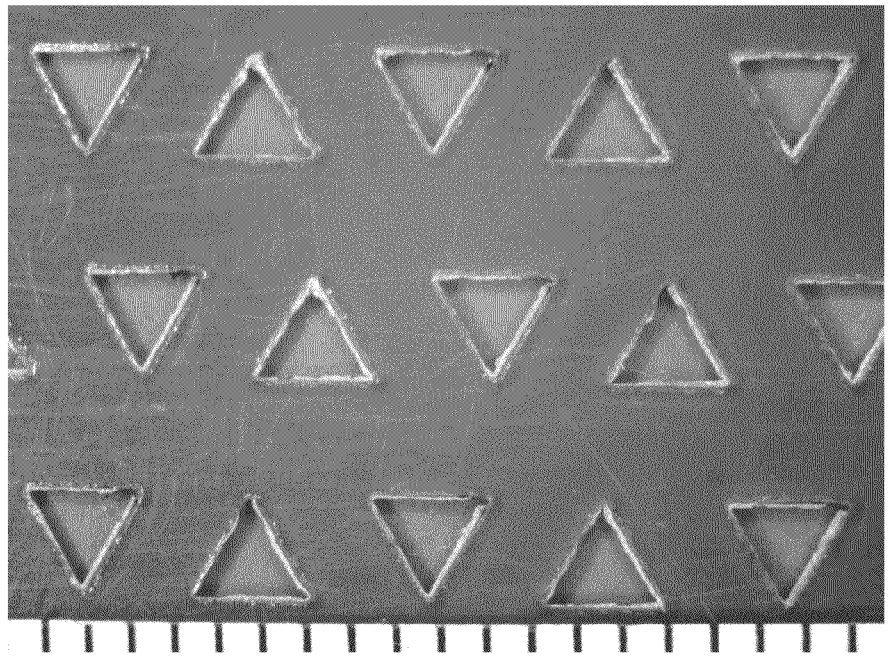
FIG. 2 is a photograph of the top surface of a printing screen suitable for use with either the continuous mode or a batch mode screen printing process according to the invention.

As used herein, "generally triangular" means a triangular shape or three-sided tapered or non-tapered polygons having rounded corners instead of vertices as shown in FIGS. 2, 3, and 4.

As used herein, a "post-formation flowed surface" means a surface of a shaped abrasive particle that significantly slumps after removal of the shaped dispersion from the printing screen or mold. As such, the shaped abrasive particle will have a larger surface area on one side due to the slumping and a thickness or height which is less than a shaped abrasive particle made from the same printing screen or mold that does not slump significantly. A post-formation flowed surface is a relatively smooth surface having smooth contours and slopes resulting from relocation of the shaped dispersion due to forces (such as gravity or a differential applied pressure) under conditions (such as lower viscosity sol gels or slower drying rates) that allow the slumping to occur. Flashing or extremely thin areas of sol gel attached to the surfaces of the shaped abrasive particle due to overfilling of the printing screen or mold such that sol gel extends past the intended predetermined geometric shape in the printing screen or mold is not a post-formation flowed surface.

As used herein, a "shaped abrasive particle" means an abrasive particle formed by placing a dispersion into apertures in a printing screen or into a mold cavity, the apertures or the mold cavities having a predetermined geometric shape that produces abrasive particles which resemble that shape, but may not perfectly replicate it.

As used herein, a "textured surface" means a shaped abrasive particle surface having a rough or grainy surface quality. A textured surface can be produced by an air permeable receiving surface in combination with vacuum that pulls the sol gel into intimate contact with the receiving surface. The textured surface may partially replicate the weave or mesh of the receiving surface, the structure of entangled fibers forming the receiving surface, or the outlines of apertures in the receiving surface.

DETAILED DESCRIPTION

A printing screen 10 in the form of a continuous printing belt passes around a series of three rolls 12, 14, and 16. In one embodiment, near the point of separation of the printing screen 10 from a receiving surface 18, a pressure transfer roll 20 is located. In another embodiment, a conventional roll can be substituted for the pressure transfer roll 20. The space between roll 14 and the pressure transfer roll 20 defines an application zone 22; the area including the pressure transfer roll 20 and the open space between the pressure transfer roll and roll 16 defines a disengagement zone 24; the space between rolls 16 and 12 defines a cleaning zone 26; and the space between rolls 12 and 14 defines a treatment zone 30.

In the application zone 22, the printing screen 10 is held in firm contact with a continuous belt 32 along its outside surface while both belts move in the same direction at essentially the same speed and a dispersion of ceramic precursor particles is applied to the inside surface of the printing screen 10, (application mechanism is not shown) ahead of a doctor blade 34. A suitable pump and a manifold or slotted die can be used to apply the dispersion to the printing screen. The passage beneath the doctor blade forces the dispersion into apertures in the printing screen 10 which, at that point, is in firm contact with the continuous belt 32. If desired, a support roll can be located underneath the continuous belt 32 opposite the doctor blade 34 to reduce deflection of the printing screen 10 and the continuous belt 32. In another embodiment, a vacuum box 46 or vacuum roll can be located on the opposite surface of the continuous belt 32 having an air permeable structure. The source of vacuum can be used to assist in filling the apertures with the dispersion; especially, for high viscosity dispersions.

In the disengagement zone 24, the printing screen 10 is disengaged from the continuous belt 32 leaving one or more screen printed shapes 36 on the receiving surface 18. The disengagement zone 24 is provided with an assisted transfer of the dispersion from the apertures in the printing screen 10. The assisted transfer can comprise applying a differential pressure between a first side 38 and a second side 40 of the screen printed shape 36 that is in contact with the receiving surface 18 while being removed from the aperture in the printing screen 10.

In one embodiment, the pressure transfer roll 20 can apply a positive pressure to the first side 38 to push the screen printed shape 36 from the aperture in the printing screen 10.

The pressure transfer roll can comprise a hollow roll with a drilled outer shell. The outer shell can have a mesh, screen, fabric, or nonwoven applied over it to further distribute the pressurized fluid supplied to the pressure transfer roll 20 after passing through holes in the outer shell. Internally, fixed or adjustable baffles can be supplied to create a radial pressure zone 42 that concentrates the pressurized fluid supplied to the pressure transfer roll. The width and angular location of the radial pressure zone along with the operating pressure of the pressurized fluid and the machine direction location of the pressure transfer roll can be adjusted to cleanly remove the dispersion from the apertures in the printing screen without unduly distorting the screen printed shapes. Pressure transfer rolls (or adjustable vacuum rolls) having these and other features are known in the art of paper manufacturing equipment. In one embodiment, the pressurized fluid was air supplied by a compressor 44 and fluidly connected through a rotary union and piping to the radial pressure zone 42.

In another embodiment, the receiving surface 18 can comprise an air permeable receiving surface (for example a mesh or porous belt or fabric such as those used in the dewatering of paper during its manufacture) and a vacuum box 46 or a vacuum roll can be located in the disengagement zone 24 to provide less than atmospheric pressure to the second side 40 of the screen printed shape 36 to pull the dispersion from the aperture in the printing screen 10. The vacuum box 46 or vacuum roll is fluidly connected to a vacuum pump 48. Suitable vacuum boxes or vacuum rolls are known in the paper making art. Additionally, the vacuum box can extend into the application zone 22 or additional vacuum boxes 46 or vacuum rolls can be placed in the application zone 22 to assist with filling the apertures in the printing screen. Suitable control valves 47 can be used to regulate the vacuum applied to each zone.

Suitable air permeable receiving surfaces include any porous material having pores significantly smaller than the apertures in the printing screen. As mentioned, woven fabrics and felts as known in the paper industry can be used. Nonwoven fabrics can be used. Corrosion resistant metal screens or metal meshes can be used. Thin metal bands or belts which have been machined, stamped, or altered to render them air permeable can used. Some materials may require a suitable release agent to be applied such as oils or a coating of polytetrafluoroethene. Acceptable materials include stainless steel and polyethylene.

In one embodiment, a solid roll positioned in place of the pressure transfer roll 20 can be used in combination with the vacuum box 46 and the air permeable receiving surface. The machine direction width of the vacuum zone, the machine direction location of the vacuum box 46 or vacuum roll, and the magnitude of the vacuum supplied can be adjusted to cleanly remove the dispersion from the apertures in the printing screen without unduly distorting the screen printed shape.

Figure 1:
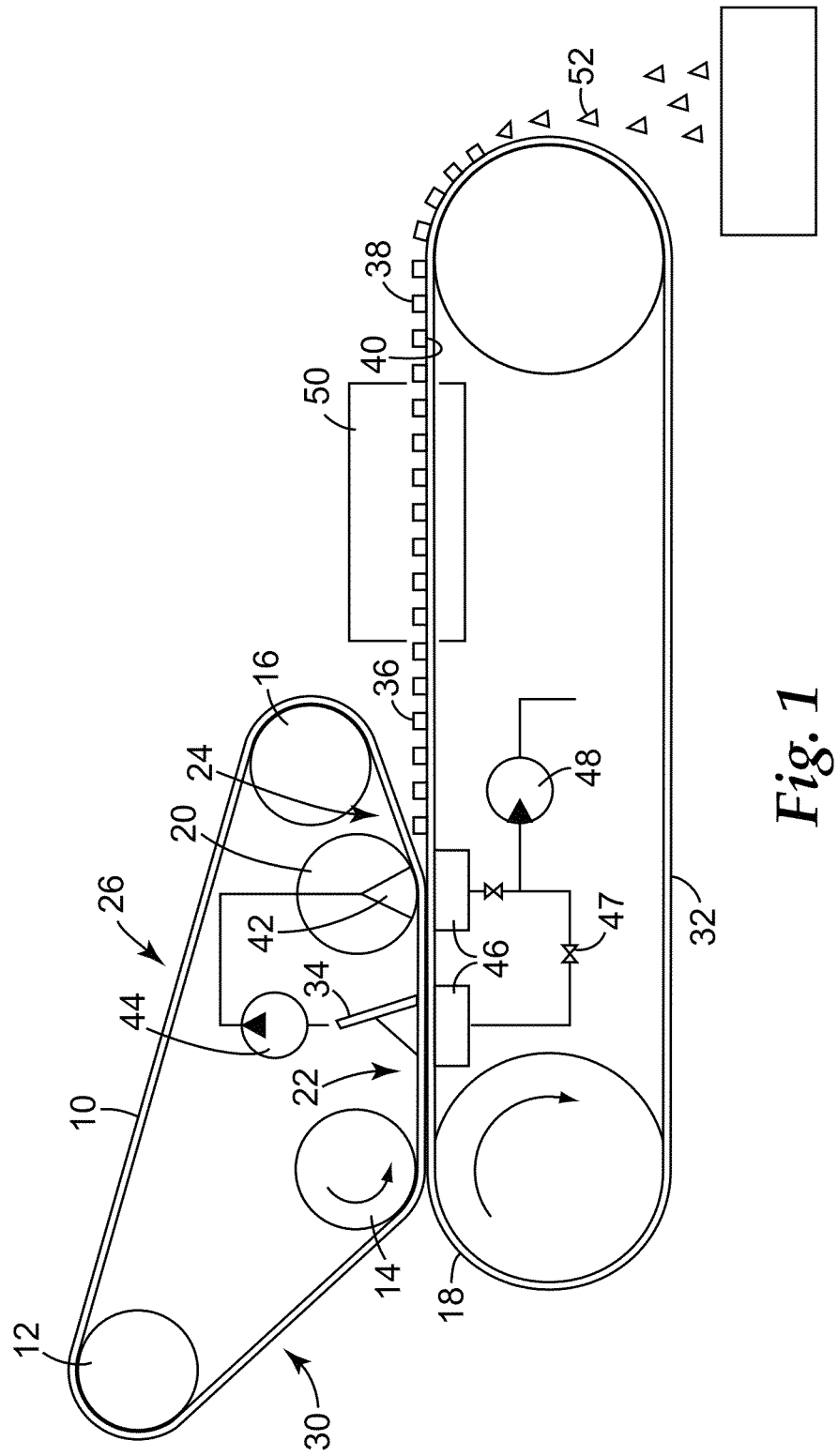
FIG. 1 is schematic representation of a screen printing process according to the invention for continuous mode operation.

Alternatively, in another embodiment, a pressure higher than atmospheric pressure can be applied to the first side 38 of the screen printed shape 36 while also applying a pressure lower than atmospheric pressure to the second side 40 by using both the pressure transfer roll 20 and the vacuum box 46 as illustrated in FIG. 1. As discussed above, the operating parameters for the pressure transfer roll and the vacuum box can be adjusted to cleanly remove the screen printed shape without unduly distorting the screen printed shape. In some embodiments, the pressure transfer roll 20 and the vacuum box 46 may be staggered in the machine direction instead of directly opposed to each other and either apparatus may be located ahead of the other apparatus relative to the direction of travel of the continuous belt 32.

The inventors have determined that using an assisted transfer is necessary to make screen printed shapes as the thickness of the screen printed shape is increased. When the thickness of the printing screen is increased beyond about 0.010" (0.25 mm) some sol gels typically used to form ceramic abrasive particles release poorly from the apertures in the printing screen. The inventors have produced screen printed shapes using a printing screen having a thickness of 0.030" (0.76 mm) on a breathable release liner (Part-Wick #4400 manufactured by US Paper Corporation) which was positioned over a vacuum box on a plastic support grid at a vacuum of 4.5 inches of water prior to filling the apertures in the printing screen with the sol gel. If the vacuum was turned off, there was poor release and extensive deformation of the screen printed shapes when trying to remove the printing screen with a significant amount of the sol gel remaining in the apertures of the printing screen after removal.

After removal of the printing screen 10, the screen printed shapes 36 are transported by the continuous belt 32 to a drying zone 50 where moisture is withdrawn from the screen printed shapes, at least to the extent necessary to convert them to precursor abrasive particles 52 which retain their structural integrity upon handling. The precursor abrasive particles 52 are then removed from the continuous belt 32 and fired in a suitable furnace or kiln to convert them to shaped abrasive particles 55. Before the continuous belt 32 enters the application zone 22 in contact with the printing screen 10 it may be given a release treatment (such a fluorocarbon spray) if the continuous belt has not been pre-treated to give it a baked-on release layer.

Meanwhile, the printing screen 10 after leaving the disengagement zone 24 passes through the cleaning zone 26 in which the printing screen is cleaned, if necessary, to remove any residual dispersion remaining on the printing screen 10 by suitable high pressure liquid sprays, liquid baths, brushes, air blasts or combinations thereof, and then dried if needed. From the cleaning zone 26, the printing screen 10 passes to the treatment zone 30 in which a release agent may, if desired, be applied to enhance separation of the screen printed shapes 36 from apertures in the printing screen in the disengagement zone 24.

There are many variations that may be made in the arrangement described in the drawings. For example, the application of the dispersion to the printing screen can be made as the belt passes vertically as opposed to horizontally. The printing screen 10 may also be provided by the surface of a single hollow drum with the zones 22, 24, 26, and 30 provided by different segments of the circumference of the drum. All such variations are embraced within the scope of this invention.

The shape of the apertures may be varied and selected according to the final use of the shaped particles. It will however be clear that the process offers a method of producing virtually identical shapes in large quantities or, if desired, an exact mix of a variety of pre-determined shapes. The preferred application of the process of the invention is the production of ceramic shaped abrasive particles; although it is useful to produce ceramic shapes not intended for use in an abrasive article. These shapes may be angular or round and useful shapes include regular rectangular shapes with an aspect ratio, that is the ratio of length to the greatest cross-sectional dimension, of from about 2:1 to about 50:1 and preferably from about 5:1 to about 25:1. Similar aspect ratios can be used for shapes other than rectangular ones.

Other useful shapes include shaped abrasive particles comprising thin disks having various geometric shapes such as triangles, squares, rectangles, or circles as disclosed in U.S. Pat. No. 5,201,916 to Berg; U.S. Pat. No. 5,366,523 to Rowenhorst (Re 35,570); and U.S. Pat. No. 5,984,988 to Berg. A particularly preferred shape is an equilateral triangular shape as shown in FIGS. 3 and 4. As will be discussed later, using a lower viscosity sol gel such that second side of the shaped abrasive particle is lager than the first side and the edges of the shaped abrasive particle are slumped have been found to have enhanced grinding performance.

The apertured screen can be made from any suitable material such as stainless steel, plastic such as PTFE, EVA, polyester or nylon, fabrics and the like. The thickness of the printing screen can vary and may be changed to vary the thickness of the resulting screen printed shape. Suitable thicknesses for the printing screen are typically about 10 mm and more typically 3 mm or less. Screen printing is a well-known procedure and materials generally suitable for producing the screens are generally also useful in this invention. Suitable release agents such as silicones, fluorocarbons or hydrocarbon derivatives can be applied in the treatment zone 30, if desired, to improve the release properties of the dispersion from the screen. Similar release agents can be used on the continuous belt 32 or on the air permeable receiving surface.

The apertured printing screen used in the screen printing operation can be readily adapted for use in a batch mode or in a continuous mode. When the screen thickness is larger (around 10 mm), the screen is generally not flexible enough to use a continuous process in which the printing screen is in the form of a continuous printing belt. For most applications, the preferred operation is in a continuous production mode. In such an automated operation, the apertured printing screen usually takes the form of a driven printing belt and this implies that the predominant stress on the printing belt is in the longitudinal direction, that is, it will tend to be stretched. If the largest dimension of the apertures is aligned in the direction of movement of the printing belt, the tendency to stretch will lead to less distortion of the cross-section of the apertures. This is a desired orientation of the apertures when using a printing screen in the form of a driven printing belt.

When in use the printing screen 10, when in the form of a printing belt, is in contact with the continuous belt 32 as it passes through the application zone 22. The printing belt therefore should preferably be made from a moisture resistant material to ensure it is not affected by the water or acid content of the sol gel. Since the printing belt is also driven, it is preferred that it be relatively inextensible. It should preferably also be substantially smooth so as to avoid the sol gel penetrating the material of the printing belt making separation difficult. Many alumina sol gels have an acidic pH, especially if they have been peptized by addition of an acid, and therefore the preferred printing belts should have substantial corrosion resistance. Preferred materials meeting these criteria include stainless steel, chrome-plated nickel, polytetrafluoroethylene, copolymers comprising a fluorinated ethylene monomer component, and polypropylene. These materials are also suitable to make the continuous belt 32 having an air permeable receiving surface.

For some materials used to make the printing screen, it is desirable to coat the material with a release coating to facilitate removal of the screen printed shapes from the printing screen. The release coating can, for example, be a baked-on fluoropolymer such as that commonly sold under the DuPont Co. trademark "Teflon". Alternatively the coating can be sprayed on before use. Such spray on coatings would include organic lubricants such as octanol, decane, hexadecane, oils, and the like. It is understood the same considerations apply when designing the apertured screen in a different form such as a simple sheet as might be appropriate for operation in a batch mode. These materials are also suitable for use as release agents on the continuous belt 32 having an air permeable receiving surface.

FIG. 2 is a photomicrograph showing a top view of one embodiment of a printing screen. The printing screen was constructed from a polycarbonate sheet that was 0.030" (0.76 mm) thick. The apertures in the printing screen formed a pattern of nested rows of equilateral triangles that were 0.110" (2.79 mm) per side and the rows were 0.100" (2.54 mm) apart at the apexes or bases. The apertures were made using laser machining techniques and the apertures were not tapered such that the openings in the top and bottom surfaces of the printing screen were approximately the same size.

Materials that can be made into shaped ceramic objects using the process of the invention include physical precursors such as finely divided particles of known ceramic materials such as alpha alumina, silicon carbide, alumina/zirconia and CBN. Also included are chemical and/or morphological precursors such as aluminum trihydrate, boehmite, gamma alumina and other transitional aluminas and bauxite. The most useful of the above are typically based on alumina and its physical or chemical precursors. It is to be understood however that the invention is not so limited but is capable of being adapted for use with a plurality of different precursor materials.

Other components that have been found to be desirable in certain circumstances for the production of alumina-based particles include nucleating agents such as finely divided alpha alumina, ferric oxide, chromium oxide and other materials capable of nucleating the transformation of precursor forms to the alpha alumina form; magnesia; titania; zirconia; yttria; and rare earth metal oxides. Such additives often act as crystal growth limiters or boundary phase modifiers. The amount of such additives in the precursor is usually less than about 10% and often less than 5% by weight (solids basis).

It is also possible to use, instead of a chemical or morphological precursor of alpha alumina, a slip of finely divided alpha alumina itself together with an organic compound that will maintain it in suspension and act as a temporary binder while the particle is being fired to essentially full densification. In such cases, it is often possible to include in the suspension materials that will form a separate phase upon firing or that can act as an aid in maintaining the structural integrity of the shaped particles either during drying and firing, or after firing. Such materials may be present as impurities. If, for example, the precursor is finely divided bauxite, there will be a small proportion of vitreous material present that will form a second phase after the powder grains are sintered together to form the shaped particle.

The dispersion used is able to be formed into a screen printed shape that resembles the aperture in the screen; although, as discussed later, it may be desirable for this shape to change by fluid flow or solids mechanics after the printing process becoming larger at the base and having slumping sidewalls. Necessary stability could be achieved by the use of additives where a gel of the precursor is not readily obtained. The solids content of the dispersion is a factor in the invention if shape retention is not achieved by the use of additives. At the lower solids contents it may be necessary to adjust the viscosity to prevent total loss of the printed shapes when the printing screen is removed. This may be done by addition of a viscosity adjustment agent. Where the dispersion is a sol gel the preferred technique is peptization using an acid such as nitric acid. If the dispersion has too high a solids content however, there may be difficulty in filling the screen apertures consistently. A vacuum box 46 or vacuum roll located in the application zone 24 adjacent to the air permeable receiving surface opposite the assembly filling the apertures in the printing screen with the dispersion can be used to overcome or reduce such inconsistencies.

The dispersion that is employed in the process of the invention may be any dispersion of a ceramic precursor such as a finely dispersed material that, after being subjected to the process of the invention, is in the form of a shaped ceramic article. The dispersion may be chemically a precursor, as for example boehmite is a chemical precursor of alpha alumina; a morphological precursor as for example gamma alumina is a morphological precursor of alpha alumina; as well as (or alternatively), physically a precursor in the sense of that a finely divided form of alpha alumina can be formed into a shape and sintered to retain that shape.

Where the dispersion comprises a physical or morphological precursor as the term is used herein, the precursor is in the form of finely divided powder grains that, when sintered together, form a ceramic article, such as an abrasive particle of utility in conventional bonded and coated abrasive applications. Such materials generally comprise powder grains with an average size of less than about 20 microns, preferably less than about 10 microns and most preferably less than about a micron.

The dispersion used in a preferred process is most conveniently a boehmite sol gel. The sol gel may be a seeded sol gel that comprises finely dispersed seed particles capable of nucleating the conversion of alumina precursors to alpha alumina or an unseeded sol gel that transforms into alpha alumina when sintered.

The solids content of the dispersion of a physical or a morphological precursor is preferably from about 40 to 65% though higher solids contents of up to about 80% can be used. An organic compound is frequently used along with the finely divided grains in such dispersions as a suspending agent or perhaps as a temporary binder until the formed particle has been dried sufficiently to maintain its shape. This can be any of those generally known for such purposes such as polyethylene glycol, sorbitan esters and the like.

The solids content of a precursor that changes to the final stable ceramic form upon heating may need to take into account water that may be liberated from the precursor during drying and firing to sinter the abrasive particles. In such cases the solids content is typically somewhat lower such as about 75% or lower and more preferably between about 30% and about 50%. With a boehmite sol gel, a maximum solids content of about 60% or even 40% is preferred and a sol gel with a peptized minimum solids content of about 20% may also be used.

Abrasive particles made from physical precursors will typically need to be fired at higher temperatures than those formed from a seeded chemical precursor. For example, whereas particles of a seeded boehmite sol gel form an essentially fully densified alpha alumina at temperatures below about 1250 degrees C., particles made from unseeded boehmite sol gels may require a firing temperature of above about 1400 degrees C. for full densification.

Shaped abrasive particles that have been fired to final hardness may be incorporated into a bonded abrasive article such as a grinding wheel, or used to make a coated abrasive article such as a grinding disc or belt, or incorporated into a nonwoven abrasive article, or incorporated into an abrasive brush. Alternatively, the abrasive grain can be screened or graded to an abrasive industry specified grade for sale or use in the above mentioned products. Abrasive industry specified grades could include ANSI standards, FEPA standards, JIS standards, or shaped abrasive particles graded to a nominal screen grade using ASTM Standard Test Sieves (for example—18+20 meaning the shaped abrasive particles pass through a number 18 sieve and are retained on a number 20 sieve).

Referring now to FIGS. 3 and 4, and as further discussed in the Examples, shaped abrasive particles were made using the printing screen of FIG. 2 in a batch mode. The viscosity of the sol gel was adjusted to made shaped abrasive particles using both a higher viscosity sol gel having a higher maximum yield stress and a lower viscosity sol gel having a lower maximum yield stress from the same printing screen.

Figure 3A:
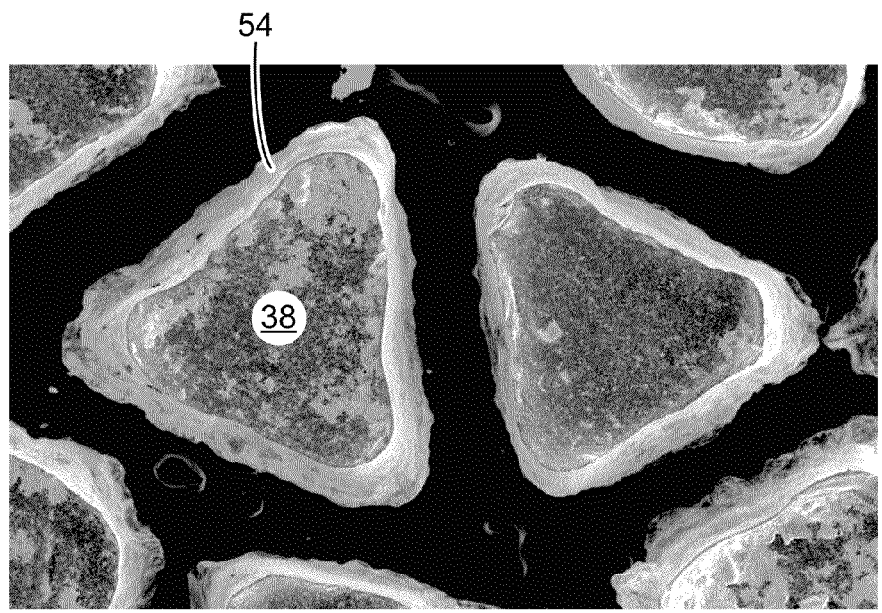
FIGS. 3A, 3B, and 3C are photomicrographs showing top, side and perspective views of shaped abrasive particles made with a higher viscosity sol gel using the printing screen illustrated in FIG. 2.
Figure 3B:
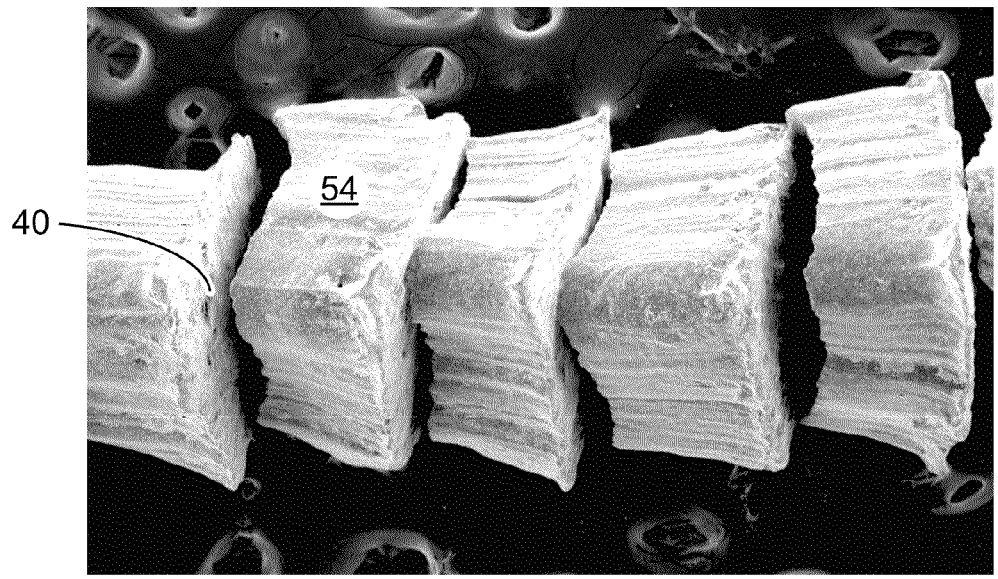
Figure 3C:
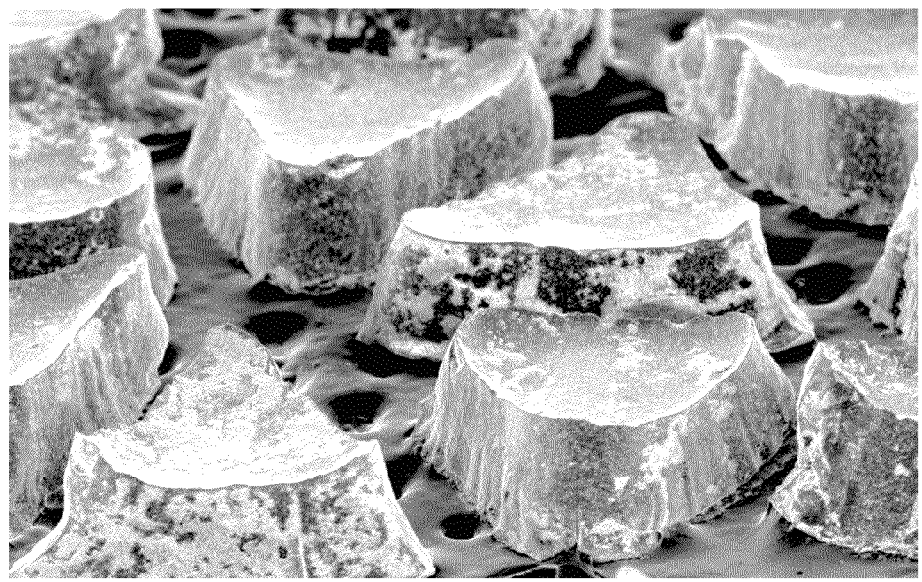

As seen in FIG. 3A, the shaped abrasive particles made with the higher viscosity sol gel having a maximum yield stress of 80,154 Pa had much less taper from the second side 40 to the first side 38. The perimeter of the second side 40 is slightly larger than the perimeter of the first side 38 and less of the sidewall 54 connecting the first side to the second side is visible in the photomicrograph. The first side 38 or the air side of the shaped abrasive particle during drying is seen outlined in the center of each shaped abrasive particle in FIG. 3A. The second side 40 or the supported side of the shaped abrasive particle in contact with the receiving surface 18 during dying is partially visible in FIG. 3B. The second side 40 comprises a textured surface produced by the vacuum pulling the sol gel at least partially into the air permeable receiving surface. The sidewall 54 connecting the first side 38 to the second side 40 as seen in FIG. 3B is scored or ridged tending to replicate the ridges in the printing screen from the laser machining as seen in FIG. 2. Additionally, the sidewall 54 has a fairly steep slope having approximately the same gradient at all locations between the first side 38 and the second side 40. The shaped abrasive particles after drying tend to have a concave first side 38 and a slightly convex or flat second side 40 as seen in FIG. 3C. The shaped abrasive particles taper slightly from the second side 40 to the first side 38; however, the angle or slope of the sidewall is quite large and much greater than 60 degrees relative to the second side 40. It is estimated that the sidewall angle relative to the second side 40 is between about 70 to abut 80 degrees based on the photomicrographs.

Figure 4A:
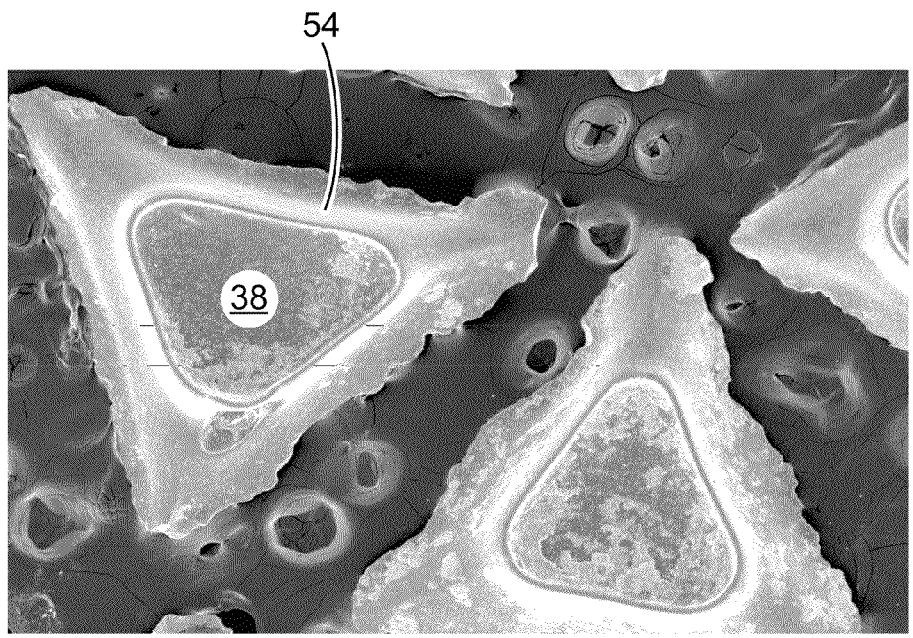
FIGS. 4A, 4B, and 4C are photomicrographs showing top, side, and perspective views of shaped abrasive particles made with a lower viscosity sol gel using the printing screen illustrated in FIG. 2.
Figure 4B:
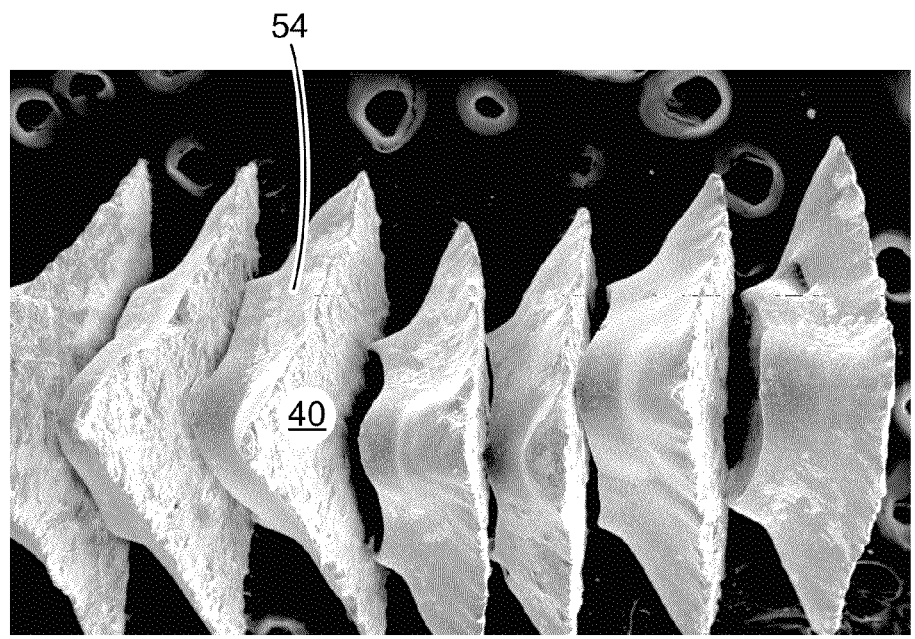

As seen in FIG. 4A, the shaped abrasive particles made with the lower viscosity gel having a maximum yield stress of 10,154 Pa had much more taper from the second side 40 to the first side 38. The perimeter of the second side 40 is significantly larger than the first side 38 and more of the sidewall 54 connecting the first side 38 to the second side 40 is visible in the photomicrograph. The sidewall 54 comprises a post-formation flowed surface. As such, the shaped abrasive particles tend to be thinner than the shaped abrasive particles produced from the high viscosity sol gel, which is seen by comparing FIG. 3B to FIG. 4B. The first side 38 or the air side of the shaped abrasive particle during drying is seen outlined in the center of each shaped abrasive particle in FIG. 4A. The second side 40 or the supported side of the shaped abrasive particle in contact with the receiving surface 18 during dying is partially visible in FIG. 4B. The second side 40 comprises a textured surface produced by the vacuum pulling the sol gel at least partially into the air permeable receiving surface. The sidewall 54 connecting the first side 38 to the second side 40 as seen in FIG. 4B is not scored or ridged and is fairly smooth due to the sol gel flow or creep after removal of the screen printed shapes from the printing screen. The ridges visible in the sidewall 54 of the shaped abrasive particles in FIG. 3B are no longer visible in FIG. 4B even though the same printing screen was used.

Figure 4C:
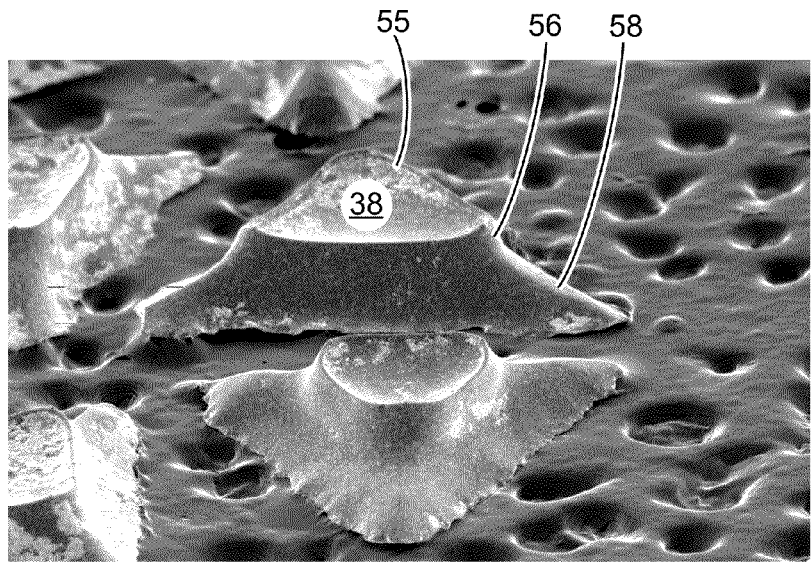

Additionally, the sidewall 54 does not have a substantially uniform slope or gradient along its length. As best seen in FIG. 4C, the sidewall 54 of the shaped abrasive particle 55 comprises a first portion 56 intersecting with the first side 38 having a steeper slope or angle than a second portion 58 intersecting with the second side 40. Additionally, the length of the first portion 56 is shorter than the length of the second portion 58. Although such a sidewall configuration was produced by slumping of the sol gel after being screen printed it is possible to design a printing screen or a mold having one or both of these features to mold the sidewall 54 into this configuration when using high viscosity sol gels. The sidewall 54 could comprise a first surface 56 intersecting a second surface 58 at a predetermined angle and the length of each surface could be varied as desired with either surface being larger than the other.

The shaped abrasive particles after drying tend to have a concave first side 38 and a slightly convex or flat second side 40 as seen in FIG. 4B. The shaped abrasive particles taper significantly from the second side 40 to the first side 38 and the angle or slope of the sidewall at which the sidewall 54 intersects with the second side 40 is much smaller. The angle, as best seen in FIG. 4B, was measured for 20 shaped abrasive particles using image analysis techniques and the average angle was found to be 33.9 degrees, which is much less than the expected angle of 90 degrees since the apertures in the printing screen were not tapered.

In various embodiments of the invention, the angle between the sidewall 54 and, specifically, the second portion 58 and the second side 40 can be less than about 60, 50, 45, or 40, or 35 degrees and greater than about 10 degrees. In general, if angle is less than about 10 degrees the edges of the shaped abrasive particle can become too weak and fracture too readily during use for some applications.

Physical Testing

Maximum Yield Stress

The sol gel maximum yield stress (maximum viscosity as a function of shear rate) is measured using a rheometer such as a Bohlin Gemini 200 available from Malvern instruments Ltd, having an office in Worcestershire, United Kingdom. The measurement of the sol gel is made after coming to temperature equilibrium at 25 degrees Celsius at shear rates between 0.01 and 1000 sec−1. In various embodiments of the invention, the maximum yield stress of the sol gel to produce screen printed shapes that creep or flow during drying to produce the sintered shaped abrasive particles can be less than about 90,000; about 80,000; about 70,000; about 60,000; about 50,000; about 40,000; about 30,000; about 20,000; or about 15,000 Pa·Sec [Pascal(seconds)]; and greater than about 5,000 Pa·Sec. If the viscosity becomes too low, the screen printed shape will no longer resemble the predetermined shape formed in the printing screen or mold after removal of the dispersion from the printing screen or mold.

Second Side to First Side Area Ratio

The Second Side to First Side Area Ratio is determined by image analysis on the densified, sintered shaped abrasive particle. The shaped abrasive particle is mounted by its second side 40 and positioned in a scanning electron microscope (SEM) to take a top view photomicrograph of the first side 38 (SEM line of sight at approximately 90 degrees to the first side) using back scattered electron imaging in an SEM. An appropriate magnification is used such that the entire shaped abrasive particle can be viewed, and 1 to 2 complete shaped abrasive particles fill the SEM's field of view. A typical SEM image of the shaped abrasive particles is shown in FIGS. 3A and 4A at 50× magnification.

Next, using image analysis software such as Image J (available from the National Institute of Health), the area of the first side 38 bounded by its perimeter and the area of the second side 40 bounded by its perimeter is measured for 10 different shaped abrasive particles. In some instances, it may be necessary to trace the perimeter manually if sufficient contrast is not present for the image analysis software to automatically detect each perimeter. The ten first side areas and the ten second side areas are individually averaged and the Second Side to First Side Area Ratio is determined by the Average Second Side Area divided by the Average First Side Area. A larger Second Side to First Side Area Ratio results from increased sol gel slumping when the top and bottom openings in the printing screen are of the same size or when the printing screen or mold is intentionally tapered. A ratio of 1.0 would occur for perfectly dimensionally stable dispersions after screen printing with a non-tapered aperture. The shaped abrasive particles of FIG. 3 were found to have a Second Side to First Side Area Ratio of 1.65 with a standard deviation of approximately 0.15 if 10 individual ratios were calculated instead of averaging the 10 separately measured first side and second side areas. The shaped abrasive particles of FIG. 4 were found to have a Second Side to First Side Area Ratio of 3.44 with a standard deviation of approximately 0.44 if 10 individual ratios were calculated instead of averaging the 10 separately measured first side and second side areas.

In various embodiments of the invention, the Second Side to First Side Area Ratio can between about 1.5 to about 10.0, or between about 2.0 to about 10.0, or between about 2.0 to about 6.0, or between about 3.0 to about 5.0, or between about 2.0 to about 3.5, or between about 1.5 to about 3.5.

Thickness Ratio

To calculate the thickness ratio, fifteen randomly selected shaped abrasive particles are screened. The height of each corner of each particle is measured and then all of the heights are averaged to determine an average Tc. For example, a triangle would have three Tc measurements per shaped abrasive particle and 45 measurements total for use in determining the average for Tc. If the shaped abrasive particle is round, oval or otherwise does not have corners or points, then three points equidistant from each other along the perimeter should be measured for each shaped abrasive particle. Next, the smallest thickness, Ti, for the interior of the first side 38 of each shaped abrasive particle is measured. Often the translucency of the shaped abrasive particle can be used to find the minimum interior thickness and the 15 results are averaged to determine an average Ti. The thickness ratio is determined by dividing the average Tc by the average Ti.

A light microscope equipped with an X-Y stage and a vertical location measurement stage can be used to measure the thickness of various portions of the shaped abrasive particles. Triangular shaped particles produced by the prior art method disclosed in U.S. Pat. No. 5,366,523 entitled Abrasive Article Containing Shaped Abrasive Particles to Rowenhorst et al. have been measured to have thickness ratios between 0.94 to 1.15, meaning they are essentially flat and are just as likely to be slightly thicker in the middle as they are to be slightly thinner in the middle. Shaped abrasive particles having a thickness ratio greater than 1.20 are statistically different from the Rowenhorst particles at the 95% confidence interval. Shaped abrasive particles having a recessed surface are also disclosed in U.S. patent application Ser. No. 12/336,961 filed on Dec. 17, 2008 entitled Dish-Shaped Abrasive Particles With A Recessed Surface. In various embodiments of the invention, a Thickness Ratio of Tc/Ti of the concave first side 38 can be between about 1.20 to about 5.00, or between about 1.25 to about 5.00, or between about 1.25 to about 4.00, or between about 1.25 to about 2.00.

EXAMPLES

Objects and advantages of this disclosure are further illustrated by the following non-limiting examples. The particular materials and amounts thereof recited in these examples as well as other conditions and details, should not be construed to unduly limit this disclosure. Unless otherwise noted, all parts, percentages, ratios, etc. in the Examples and the rest of the specification are by weight.

Gel Preparation

Boehmite gels (Gel A and Gel B) of two different viscosities were made by dispersing aluminum oxide monohydrate powder having the trade designation "DISPERAL" (Sasol North America, Houston, Tex.) by continuous mixing in a solution containing water and either 3.0 percent nitric acid (Gel A) or 4.5% nitric acid (Gel B). The sols that resulted were then heated to a temperature of approximately 125 degrees C. in a continuous dryer to produce a 40% solids dispersion (Gel A) or a 42.5% solids dispersion (Gel B). The resulting maximum yield stress for Gel A was 10,154 Pa and the resulting maximum yield stress for Gel B was 80,154 Pa.

Examples 1 and 2

Shaped abrasive particles and abrasive articles of Example 1 were prepared from Gel A. An open-faced acrylic box was used as a vacuum box and the open face of the acrylic box was covered with a rigid plastic grid material to allow relatively unblocked air flow into the box. A perforated metal screen supported the plastic grid. The vacuum source was a "NILFISK Advance model GMP-J-115" vacuum cleaner (Nilfisk-Advance Inc., Plymouth, Minn.) which was capable of providing a vacuum of about 6" Hg (0.8 kPa.). The area subject to vacuum was approximately 7"×9" (18 cm×23 cm) and a vacuum gauge was attached to the acrylic box to indicate vacuum pressure within the box. A printing screen was constructed from polycarbonate sheet that was 0.030" (0.76 mm) thick. The aperture pattern on the printing screen was nested rows of equilateral triangles that were 0.110" (2.79 mm) per side. The rows were 0.100" (2.54 mm) apart at the apexes or bases. The apertures were made by laser machining techniques. A breathable release liner was used as an air permeable receiving surface during vacuum screen printing. The breathable release liner was identified as "PART-WICK #4400" and was manufactured by PacoThane Technologies, Woburn, Mass.

Shaped abrasive particles for evaluation were made by first placing the breathable release liner onto the plastic grid of the vacuum box and turning on the vacuum. The air flow causes the liner to suck down to the top of the vacuum box and resulted in a vacuum of about 4.5" Hg (0.6 kPa) as indicated by the vacuum gage. The printing screen was then placed on top of the release liner. A liberal amount of Gel A was placed on top of the patterned screen and was screeded into the apertures using an 8" (20 cm) wide flexible steel drywall tool. The vacuum increased to about 5.5" Hg (0.73 kPa) after filling the printing screen apertures, indicating that the air flow through the breathable release liner had decreased. With the vacuum still on, the printing screen was removed from the air permeable receiving surface leaving the surface coated with screen printed shapes. The vacuum was turned off and the receiving surface with the still-wet screen printed shapes was removed from the top of the vacuum box. The receiving surface with the screen printed shapes was allowed to dry at 45 degrees Celsius for 1 hour after which the precursor shaped abrasive particles could be easily scraped off the receiving surface without damaging the particles. Multiple batches of precursor shaped abrasive particles were made in this fashion and collected to provide sufficient quantities for firing and subsequent testing.

The precursor shaped abrasive particles were calcined at approximately 650 degrees Celsius and then saturated with a mixed nitrate solution containing 1.4% as MgO, 1.7% as $Y_2O_3$, 5.7% as $La_2O_3$, and 0.07% as CoO impregnated at a level 70% by weight based on the weight of calcined, precursor shaped abrasive particles. Prior to impregnation, "HYDRAL COAT 5" powder (0.5 micron mean particle size, available from Almatis of Pittsburgh, Pa.) was dispersed in the impregnation solution at a level of 1.4% by weight based on the weight of the impregnation solution. Sufficient mixing was achieved to keep the "HYDRAL COAT 5" powder particles in suspension within the impregnation solution until it was added to the calcined, precursor shaped abrasive particles. Once the calcined, precursor shaped abrasive particles were impregnated, the particles were allowed to dry after which the particles were again calcined at 650 degrees Celsius and sintered at approximately 1400 degrees Celsius to final hardness to produce shaped abrasive particles. Both the calcining and sintering were performed using rotary tube kilns.

The shaped abrasive particles were then electrostatically coated onto fiber disc backings at a level of 18 grams per disc of the shaped abrasive particles using a calcium carbonate filled make coating and cryolite filled size coating. The discs were evaluated using the Grinding Test using a 1045 hardened steel workpiece.

Shaped abrasive particles and abrasive articles of Example 2 were prepared identically to those of Example 1 with the exception that the stiffer Gel B was substituted for Gel A. Additional shaped abrasive particles in Examples 4, 5, and 6 were prepared identically to those of Examples 1 and 2 except that the gel yield stress was changed to the values as noted in Table 1 by varying the percent nitric acid content to intermediate levels between those used for making GEL A and GEL B. Physical parameters for the shaped abrasive particles produced by the above method are listed in Table 1.

TABLE 1

| | Physical Testing | | | | | |
|---|---|---|---|---|---|---|
| Sample | Gel Yield Stress Pa · Sec | First Side Area mm² | Second Side Area mm² | Screen Area mm² | Second Side/ First Side | Thickness Ratio Tc/Ti |
| Example 1 | 10,154 | 0.3427 | 1.1788 | 3.137 | 3.44 | 1.40 |
| Example 2 | 80,154 | 0.5317 | 0.8750 | 3.137 | 1.65 | 1.28 |
| Example 3 | 53,850 | 0.4017 | 0.8314 | 3.137 | 2.07 | 1.46 |
| Example 4 | 29,010 | 0.4328 | 0.9616 | 3.137 | 2.22 | 1.37 |
| Example 5 | 26,366 | 0.3244 | 0.9957 | 3.137 | 3.07 | 1.43 |

Grinding Test

The abrasive discs were tested using the following procedure. 7-inch (17.8 cm) diameter abrasive discs for evaluation were attached to a rotary grinder fitted with a 7-inch (17.8 cm) ribbed disc pad face plate ("80514 Extra Hard Red" obtained from 3M Company, St. Paul, Minn.). The grinder was then activated and urged against an end face of a 0.75×0.75 in (1.9×1.9 cm) pre-weighed 1045 steel bar under a load of 10 lb (4.5 kg). The resulting rotational speed of the grinder under this load and against this workpiece was 5000 rpm. The workpiece was abraded under these conditions for a total of thirty six (36) 20-second grinding intervals (passes). Following each 20-second interval, the workpiece was allowed to cool to room temperature and weighed to determine the cut of the abrasive operation. Test results were reported as the incremental cut for each interval and the total cut removed. If desired, the testing can be automated using suitable equipment.

Figure 5:
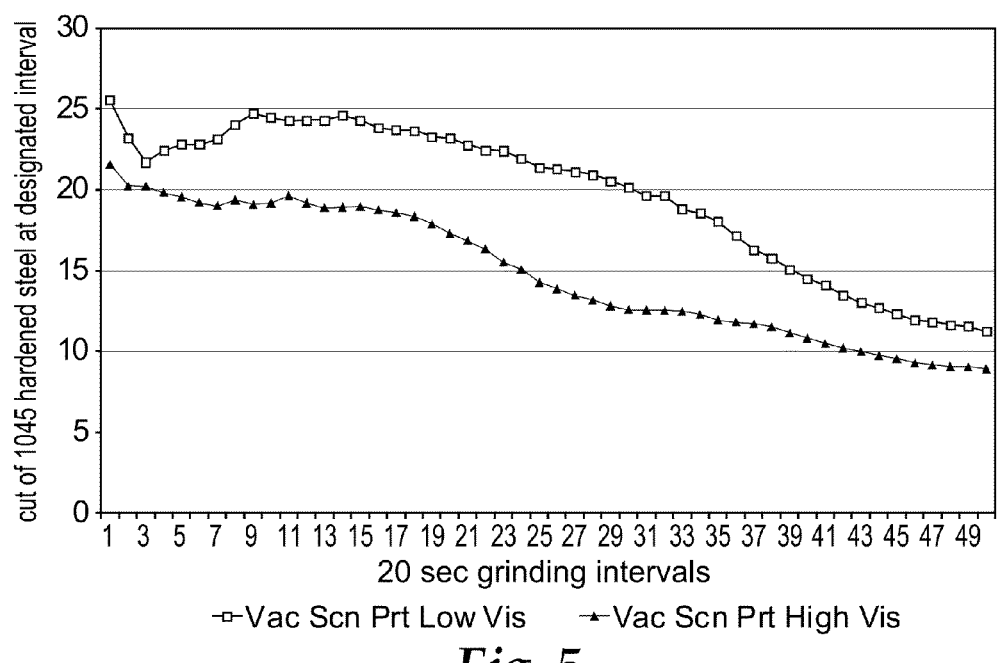
FIG. 5 is a graph of cut versus time comparing the grinding performance of shaped abrasive particles made with the high and low viscosity sol gels.

A summary of the test results are shown graphically in FIG. 5. The plot clearly shows improved performance of the shaped abrasive particles made from the low viscosity sol gel over the shaped abrasive particles made from the high viscosity sol gel. SEM photomicrographs show that the low viscosity particles flowed or slumped significantly after the shaping process most likely during the drying process when compared to particles made using high viscosity gel. As a result, the low viscosity shaped abrasive particles have much sharper (thinner) edges resulting in higher performance.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A process for the production of shaped ceramic articles by a screen printing process which comprises applying a dispersion of a ceramic precursor to a receiving surface through a printing screen comprising a plurality of apertures, removing the printing screen from the receiving surface to form a plurality of screen printed shapes while applying a differential pressure between a first side of the screen printed shape and a second side of the screen printed shape that is in contact with the receiving surface, at least partially drying the screen printed shapes remaining on the receiving surface and firing the screen printed shapes to form sintered shaped ceramic articles.

2. The process according to claim 1 wherein the ceramic precursor is a chemical precursor.

3. The process according to claim 1 wherein the dispersion comprises an alpha alumina precursor.

4. The process according to claim 3 wherein the dispersion is a boehmite alumina sol gel.

5. The process according to claim 4 wherein the sol gel has a solids content of between about 30% to about 60% by weight.

6. The process according to claim 4 wherein the sol gel has a maximum yield stress and the maximum yield stress is between about 60,000 Pa·Sec to about 5,000 Pa·Sec.

7. The process according to claim 5 wherein the sol gel maximum yield stress is between about 15,000 Pa·Sec to about 5,000 Pa·Sec.

8. The process according to claim 1 wherein the applying a differential pressure comprises applying a positive pressure to the first side of the screen printed shapes.

9. The process according to claim 8 where the applying a differential pressure comprises applying a negative pressure to the second side of the screen printed shapes.

10. The process according to claim 1 where the applying a differential pressure comprises applying a negative pressure to the second side of the screen printed shapes.

11. A process for the production of shaped abrasive particles comprising alpha alumina, the process comprising screen printing shapes of a boehmite alumina sol gel onto a receiving surface to form a plurality of screen printed shapes, removing the screen printed shapes from a printing screen while applying a differential pressure between a first side of the screen printed shapes and a second side of the screen printed shapes that are in contact with the receiving surface, at least partially drying the screen printed shapes and firing the screen printed shapes at a temperature sufficient to convert the alumina to the alpha phase.

12. The process according to claim 11 wherein the printing screen comprises apertures having dimensions to produce screen printed shapes with an aspect ratio of between about 2:1 to about 50:1.

13. The process according to claim 11 wherein the printing screen comprises a plurality of generally triangular apertures.

14. The process according to claim 11 wherein the applying a differential pressure comprises applying a positive pressure to the first side of the screen printed shapes.

15. The process according to claim 14 wherein a pressure transfer roll is used to apply the positive pressure.

16. The process according to claim 14 where the applying a differential pressure comprises applying a negative pressure to the second side of the screen printed shapes.

17. The process according to claim 11 where the applying a differential pressure comprises applying a negative pressure to the second side of the screen printed shapes.

18. The process according to claim 17 wherein the receiving surface is air permeable and a vacuum box or vacuum roll is positioned adjacent to the receiving surface opposite the second side of the screen printed shapes on the receiving surface.

19. A process for the production of shaped abrasive particles comprising alpha alumina, the process comprising screen printing shapes of a boehmite alumina sol gel onto an air permeable receiving surface, the air permeable receiving surface located adjacent to a vacuum box or vacuum roll while filling apertures in a printing screen with the sol gel to form a plurality of screen printed shapes, removing the screen printed shapes from the printing screen, at least partially drying the screen printed shapes, and firing the screen printed shapes at a temperature sufficient to convert the alumina to the alpha phase.

20. The process of claim 19 wherein removing the screen printed shapes from the printing screen comprises applying a differential pressure between a first side of the screen printed shapes and a second side of the screen printed shapes that are in contact with the receiving surface.

21. The process according to claim 20 wherein the applying a differential pressure comprises applying a positive pressure to the first side of the screen printed shapes.

22. The process according to claim 21 wherein a pressure transfer roll is used to apply the positive pressure.

23. The process according to claim 20 where the applying a differential pressure comprises applying a negative pressure to the second side of the screen printed shapes.

24. The process according to claim 23 wherein a vacuum box or vacuum roll is positioned adjacent to the air permeable receiving surface opposite the second side of the screen printed shapes on the receiving surface.

* * * * *

UNITED STATES PATENT AND TRADEMARK OFFICE
CERTIFICATE OF CORRECTION

PATENT NO.         : 9,150,765 B2
APPLICATION NO.    : 13/908268
DATED              : October 6, 2015
INVENTOR(S)        : Dennis Welygan Page 1 of 1

It is certified that error appears in the above-identified patent and that said Letters Patent is hereby corrected as shown below:

Specification

Column 1
Lines 7-9, after "allowed," delete "which is a national stage filing under 35 U.S.C. 371 of PCT/US2010/059830, filed Dec. 10, 2010,".

Column 7
Line 5, delete "lager" and insert -- larger --, therefor.

Column 8
Line 20, delete "aluminas" and insert -- alumina --, therefor.

Column 10
Line 38, delete "abut" and insert -- about --, therefor.

Column 11
Line 19, delete "4B,was" and insert -- 4B, was --, therefor.

Signed and Sealed this
Fourteenth Day of June, 2016

Michelle K. Lee
*Director of the United States Patent and Trademark Office*